United States Patent Office.

HENRY WURTZ, OF NEW YORK, N. Y.

Letters Patent No. 73,861, dated January 28, 1868.

---

IMPROVED PREPARATION FROM GRAHAMITE CALLED IRISINE.

---

The Schedule referred to in these Letters Patent and making part of the same.

---

TO ALL WHOM IT MAY CONCERN:

Be it known that I, HENRY WURTZ, of New York, in the county of New York, in the State of New York, have invented a new and improved Article of Manufacture or Chemical Preparation, obtained from the mineral of Ritchie county, West Virginia, called by me Grahamite; and I do hereby declare that the following is a full and exact description thereof.

*Description.*

The nature of my invention consists in operating upon pulverized Grahamite with certain liquid media or menstrua, which I have found to exert thereon a specific and partial solvent action, and to extract therefrom a peculiar resinous product, which I have named the Alpha Resinoid of Grahamite, or Viscosine, and which I have made the subject of another application for Letters Patent, leaving undissolved another new, peculiar, and valuable substance, also of resinous or resinoid character, which is the subject of this present application, and to which I have given the name of the Beta Resinoid of Grahamite.

In consequence of the magnificent and characteristic rainbow-colors which this new substance assumes when its solutions dry upon polished surfaces, I prefer, however, to designate it by the specific name Irisine.

The solvents which may be used in the preparation of raw or crude irisine, or for the extraction of the viscosine from the raw mineral, are many in number, including most liquids of the classes of ethers and natural petroleums or naphthas, the most available in practice, however, being common sulphuric ether, and the more volatile products of the distillation of petroleum, (known in commerce under the name of benzine, petroleum-naphtha, gasoline, &c.)

The powder of crude irisine, prepared as above, will of course retain all the mineral and other impurities which may have existed in the raw Grahamite, and for certain uses, (as for making varnishes, lubricators, &c.,) I prefer to refine it. This is done by dissolving it in one of the class of solvents specified by me in another application for Letters Patent, as having the power to dissolve entirely the raw Grahamite, namely, chloroform, bisulphide of carbon, oil of turpentine, and all the varieties of true benzole. In these liquids, the pure irisine, when freed from the alpha resinoid, naturally intermixed with it, is found to dissolve more rapidly and readily. Of course, to obtain the irisine in the pure and isolated form, these solutions, (after straining or filtering,) are to be evaporated or distilled to dryness. The product thus obtained is refined irisine.

*Claim.*

What I claim as my invention, and desire to secure by Letters Patent, is—

The new chemical preparation or article of manufacture, specified and described above, called by me Beta Resinoid of Grahamite, or Irisine, and consisting of the residue left undissolved in the extraction from Grahamite of the viscosine, whether the said irisine be refined by solution in one of its solvents and evaporation or not, all substantially as set forth.

In witness whereof, I have hereunto attached my signature, in Washington, D. C., this thirty-first day of July, 1867.

HENRY WURTZ.

Witnesses:
JOHN F. CLARK,
C. A. SEARS.